May 29, 1928.

E. K. MORGAN

BORING TOOL

Filed Aug. 11, 1924

1,671,307

Inventor:
Everette K. Morgan
By Wilson and McCanna
Attys

Patented May 29, 1928.

1,671,307

UNITED STATES PATENT OFFICE.

EVERETTE K. MORGAN, OF ROCKFORD, ILLINOIS, ASSIGNOR TO THE INGERSOLL MILLING MACHINE COMPANY, OF ROCKFORD, ILLINOIS, A CORPORATION OF ILLINOIS.

BORING TOOL.

Application filed August 11, 1924. Serial No. 731,360.

This invention relates in general to metal boring and has more particular reference to boring tools or reamers of the type in which a cutter holding block is held in a diametrical slot in a boring bar.

Heretofore constructions of this kind have been faulty in that the cutting edges of the blades or teeth have been so distant from or arranged in such relation to the locating and clamping faces between the cutter holding block and the boring bar that inaccuracies occurred in the location of said edges with respect to the center of the bar and such inaccuracies were frequently multiplied in setting or clamping the block by reason of the construction. Certain prior constructions have also been faulty in the use of through wedge members for clamping the cutter holding block in the boring bar or in the use of such wedge or clamping devices as set up distortion or bending stresses in the bar causing it and consequently the cutting edges to run out of true. The primary purpose of the present invention is, therefore, to improve the construction of boring tools of this kind, especially in regard to the manner in which the cutter holding block is located and clamped in the boring bar. Another purpose is to so locate and secure the cutter-holding block or the equivalent with respect to the boring bar as to prevent any tendency for displacement of the cutter block or for setting up lateral stresses in the bar by reason of unequal feed and side wall pressures incidental to boring irregular holes.

In furtherance of the foregoing, I have provided locating faces between the boring bar and the cutting edge end of the cutter block, these faces preferably comprising what I have termed lateral and longitudinal locating faces, and means preferably in the form of a clamping device acting between the boring bar and the cutting block at its end remote from said cutting edge end and preferably at a central point of application so as to clamp the block against the longitudinal locating faces and securely hold it in position on the bar. With this arrangement, the lines of clamping pressure diverge in the general direction of the components resulting from the feed and side wall pressures against the cutting edges of the tool. This principle of construction, which will be apparent from the foregoing detailed description, is particularly advantageous in its application to a line boring bar, that is, one having plural cutter blocks arranged at spaced intervals on the bar for boring holes in spaced parts of a casting or other work-piece. My invention is, however, by no means limited to this class of work but is equally advantageous in its application to any boring job.

Other objects and attendant advantages will be appreciated by those skilled in this art as the invention becomes better understood by reference to the following description when considered in connection with the accompanying drawing, in which—

Figure 1:
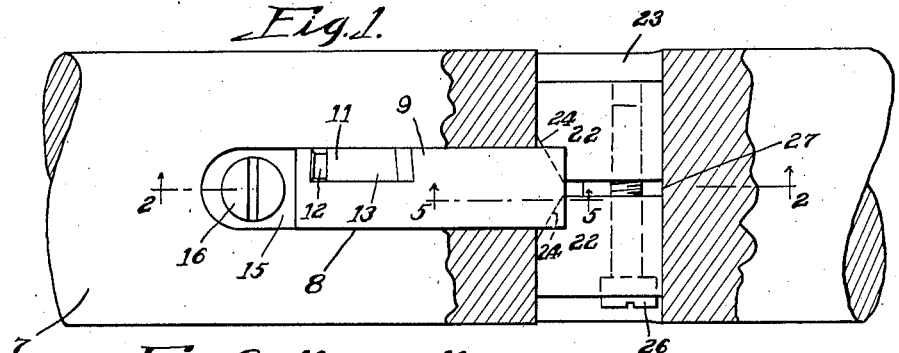
Figure 1, is a side view partly in section of a portion of a boring bar and cutters embodying my invention, showing an edge view of the cutter holding block.
Figure 2:
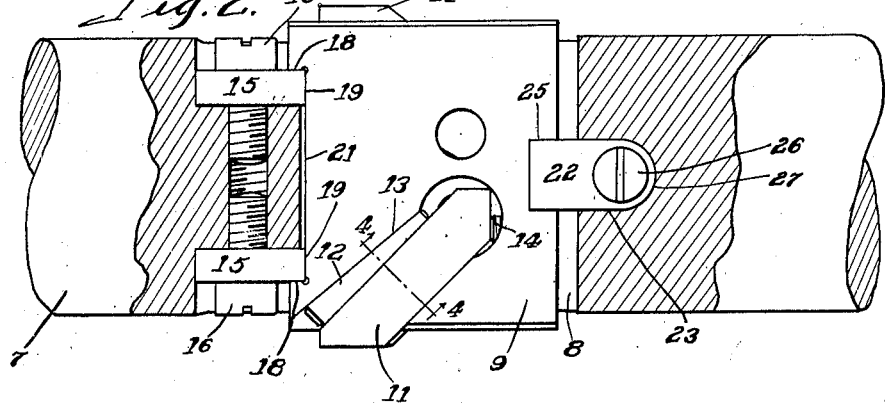
Fig. 2, is a longitudinal section taken substantially on the line 2—2 of Fig. 1 but showing in elevation certain of the parts in the line of section.
Figure 3:
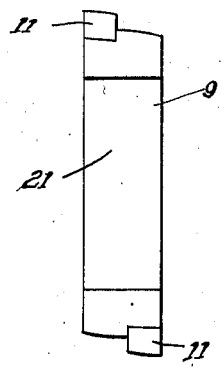
Fig. 3, is an end view of the cutter holding block looking at the cutting edge end thereof.
Figures 4, 5:
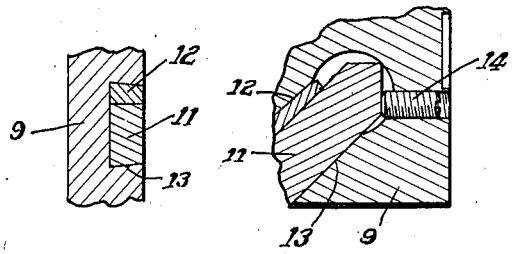
Fig. 4, is a detail section taken on the line 4—4 of Fig. 2.
Fig. 5, is a detail section taken on the line 5—5 of Fig. 1.

In the drawing only a short portion 7 of a boring bar is shown, this bar having a diametrical through slot 8 for the edgewise reception of a cutter holding block designated generally by 9.

Said block is equipped at one end at diametrically opposite corners with inserted cutter blades or teeth 11 each held in position by a wedge 12. I do not wish to confine myself to the particular shape of the blades or to the manner in which they are secured in the blocks although I prefer that they shall be adjustable for wear and shall be so arranged on the block that the cutting edges are disposed in close proximity to one end thereof. This desideratum is effected by mounting the blades in taper slots 13 in diverging relation as shown and fixedly but adjustably securing the blades therein by the wedges 12 above mentioned. A screw 14 for each blade, threaded in the blocks parallel with the longitudinal axis of the boring bar and adapted to be tightened against the inner end of its blade, is intended for advancing its blade when adjusting it for wear and for holding the blade when driving in the wedge. Means is provided for accurately locating and positively holding the cutting edge end of the block on the boring bar, the locating faces being disposed in close proximity to said cutting edges so as to avoid dimensional variances and multiplying of error incident to arranging locating faces distant from the cutting edges. In the present case this is accomplished by providing two hardened steel locating anvils 15 each secured by a screw 16 in a socket 17 milled in the periphery of the boring bar at one end of the slot 8. Each anvil extends slightly into said slot 8 and provides lateral and longitudinal locating faces 18 and 19 respectively. These faces are accurately located, the faces 18 being equi-distant from the center of the boring bar and the faces 19 coplanar in the plane of rotation. The adjacent end of the cutter holding block is milled at 21 to receive the locating end of the anvil and is accurately finished to provide locating faces complemental to said faces 18 and 19. The slot 8 in the bar is of such length that the block 9 may be inserted and then shifted lengthwise into contact with said locating faces. The block is clamped against said faces by means which exerts pressure against the block only at the center thereof and which is resisted by equal distribution of pressure centrally against the boring bar, thus avoiding b..ading stresses therein. This means comprises in the present case a pair of clamps 22 slidably fitting in a diametrical through slot 23 at right angles to and penetrating or overlapping the slot 8. Each clamp 22 has a beveled face 24 at one end and fits in a notch 25 in the adjacent edge of the block 9, the base of the notch 25 being beveled complemental to and for engagement by the beveled face 24 on the clamp. A screw 26 loose in one of the clamps and threaded in the other may be turned for drawing the clamps together and thereby move their inclined faces 24 in a wedging action against the complemental faces on the block 9 and force the latter lengthwise against the locating faces 19. By reason of this construction the clamping pressure is exerted only at a central portion of the block and in lines parallel with the longitudinal axis of the bar, it being noted that such pressure is equally divided between the clamps which are slidable in the slot 23 and is uniformly distributed against the transverse end wall 27 of said slot.

The use of a bar of this character is well known to those skilled in this art. It should be noted however that in assembling and setting up the parts the blades will be inserted and secured in the block 9 and the cutting edges will then be accurately ground while the block is held in a master bar or fixture. Thus when the cutter holding block is secured in a boring bar such as disclosed herein the cutting edges will be located and held with the desired degree of precision. It will also be observed that all of the contact faces between cooperating parts where any degree of accuracy is desired are flat and comparatively broad, thus making a very durable construction and effectually eliminating any chance of inaccuracy which might otherwise develop due to wear between contacting faces.

The term "cutter-holding block" or "cutter block" is used herein in its broad sense as meaning any cutter means applicable to boring bars of this kind, and is not limited to the use of inserted tooth cutters. It is also noted that it is not essential that the locating faces 18 and 19 shall be formed on removable blocks 15, since these faces might be formed directly on the bar. It should also be noted that my invention contemplates any suitable form of clamping means acting between the bar and cutter block for applying a clamping pressure centrally to the block, preferably at the end opposite from its cutting edge end for holding the latter end in position on the lateral locating faces.

It is believed that the foregoing conveys a clear understanding of the objects prefaced above and while I have illustrated but a single working embodiment it should be understood that changes might be made in details of construction without departing from the spirit and scope of the invention as expressed in the appended claims, in which—

I claim:

1. In a boring tool of the character described, in combination, a cutter block having cutting edges for boring purposes, a boring bar having a transverse slot for the reception of said block, means for accurately locating the cutting edge end of the block on the boring bar, and means so received in said bar as to extend transversely relative to the plane of said block for clamping the block against said locating means by pressure applied between the bar and block equally from both sides of the block but only at the central portion of the latter.

2. In a boring tool of the character described, in combination, a cutter block, a boring bar having a transverse slot for the reception of said block, means for accurately locating the cutting edge end of the block on the boring bar, means for clamping the block against said locating means by pressure applied between the bar and block only at the central portion of the latter, said clamping means comprising opposed clamps positioned in a transverse slot in the bar at right angles to said block-receiving slot and having beveled faces engaging opposite sides of the block centrally between its outer sides, and a screw connecting said clamps for drawing them together to impose the clamping pressure.

3. A boring tool of the character described comprising, in combination, a cutter-holding block, a boring bar having a diametrical slot for the reception of said block, a pair of anvil blocks secured to the bar at one end of the slot, each near the periphery and providing a lateral and a longitudinal locating face, the cutter-holding block having locating faces complemental to those on the anvil blocks, the bar having a diametrical slot at right angles to said block receiving slot at the end opposite from said anvil blocks, a pair of clamping blocks slidable in the second mentioned slot and having beveled faces engaging opposed complemental faces on the block for forcing it lengthwise against said longitudinal locating faces, and means for drawing said clamping blocks together for imposing said clamping pressure.

4. A boring tool of the character described comprising, in combination, a boring bar having a diametrical block-receiving slot, and a clamp-receiving slot, one at right angles with respect to the other, a cutter-holding block in the first mentioned slot, locating faces on the boring bar at the end of the block-receiving slot remote from the clamp-receiving slot for accurately locating the adjacent end of the block with respect to lateral and longitudinal position, a pair of clamping blocks slidable in said clamp-receiving slot, one at each side of the cutter-holding block, the latter block being notched for the reception of said clamping blocks and beveled in the notches so as to provide converging faces, said clamping blocks having beveled faces complemental to those on the cutter-holding block, and means for drawing said clamping blocks together for clamping the cutter-holding block against the longitudinal locating faces.

EVERETTE K. MORGAN.